Patented Feb. 6, 1945

2,369,042

UNITED STATES PATENT OFFICE 2,369,042

COMPOSITION FOR PRODUCING A DARK COLORED BREW FROM GRASSES

William R. Graham, Jr., Kansas City, Kans., and Clark W. McCarty, Kansas City, Mo., assignors to American Dairies Incorporated, Kansas City, Mo., a corporation of Maryland, and to The Quaker Oats Company, Chicago, Ill., a corporation of New Jersey No Drawing. Application March 18, 1942, Serial No. 435,204

2 Claims. (Cl. 99—28)

Our invention is a new composition of matter for producing a dark colored potable beverage and covers also the method of producing said composition.

A palatable brew of excellent quality may be prepared from grasses such as cereal grass, corn, sugar cane, pasture grass and the like, if they are properly treated and dried. The grasses are preferably given a preliminary drying to remove a portion of the moisture. The partially dried grasses are then crushed in any suitable manner so that the plant cells are sufficiently broken down to release the enzymes. The crushing operation is preferably performed in such a manner that the character of the leaf is not destroyed. The crushed grasses are then placed in a suitable container where they are left for a period of from thirty minutes to three days. The bacteria on the leaves and the enzymes released from the plant cells bring about fermentation. In the specification and claims I refer to the plant as being "auto-fermented." By this I mean that the plant is fermented only by bacteria and enzymes normally present on or in the plant itself. The flavor of the resulting product is determined by the extent of the fermentation. This period is therefore varied in accordance with the particular taste the product is to have. The enzymes are sensitive to heat and the fermentation action may be stopped at any time by the application of heat. If a dark colored brew is desired, it is necessary that the final drying operation be conducted at a temperature sufficient to destroy or partially destroy the chlorophyl in the grasses but insufficient to char the organic material. After the water has been largely removed, a product is obtained that may be stored without danger of decomposition or further fermentation and a tasty dark colored beverage will be produced when the product is boiled or steeped in water.

In order that the enzymes and bacteria will not be destroyed during the preliminary drying step, the grasses are first dried at room temperature and either under normal or reduced pressure. This step is sometimes termed "wilting." After some of the moisture has been expelled from the leaves, they are crushed as hereinabove described. After the crushed grasses have fermented for a predetermined period of time, they are dried at a temperature of from 150° to 500° F. for a length of time sufficient to destroy the chlorophyl in the plants but insufficient to produce an objectionable burnt flavor or to char the organic material.

As an example of a typical operation, fresh young oats were wilted for eighteen hours at room temperatures (70°–75° F.). After wilting, the oat grass was passed through rollers to break down the cell structure. During the rolling operation, the oats have a tendency to darken in color and develop a moist slippery feel.

The mat of rolled oat grass was then put in an incubator and held at a temperature of 65° to 70° F. for seven hours, at which time fermentation took place, probably due to enzymatic and bacterial action. This fermentation was terminated at a time when a pleasant aroma had developed in the mat. The period necessary to develop the aroma had been determined by a series of tests and experimental work. It was found that the aroma usually begins to develop during the first hour of incubation and increases for a period of time. This pleasant aroma, after its initial generation, continues as suggested, for a period, and then becomes unpleasant.

The fermentation time of seven hours was selected because at the end of this period, a desirable product was obtained.

On removal from the incubator, the mat of oat grass was placed in an oven and heated to a temperature of 280° F. until the mat was dry. During this heating the mat turned from a dark green to a brown or brownish black, at which time it was removed and disintegrated by rolling or crushing. The color and to an extent the taste of the brew produced is controlled by the time and temperature of the final heat treatment.

The product, when steeped or boiled in water, produces a clear brownish amber fluid having a pleasant aroma and taste.

Having thus described our invention, we claim:

1. A method of producing a dried product from the leafy portion of cereal grass from which may be produced a potable beverage comprising the steps of crushing the grass into a mat, incubating conditions for enzymatic and bacterial action permitting the autolytic fermentation so instituted to proceed until a pleasant aroma develops, then heating the fermented mat to a temperature to terminate fermentation and darken the color of the material without appreciable charring and finally disintegrating the mat.

2. A method of producing a dried product from the leafy portion of cereal grass from which may be produced a potable beverage comprising the steps of wilting the grass at a temperature to remove moisture but below that at which enzymes in the grass are destroyed, crushing the dried grass into a mat, incubating conditions for enzymatic and bacterial action permitting the autolytic fermentation so instituted to proceed until a pleasant aroma develops, then heating the fermented mat to a temperature to terminate fermentation and darken the color of the material without appreciable charring and finally disintegrating the mat.

WILLIAM R. GRAHAM, Jr.
CLARK W. McCARTY.